Aug. 14, 1962 G. L. HUSTAD 3,048,937
LIVE BAIT DISPENSER
Filed June 23, 1960 2 Sheets-Sheet 1

Grant L. Hustad
INVENTOR.

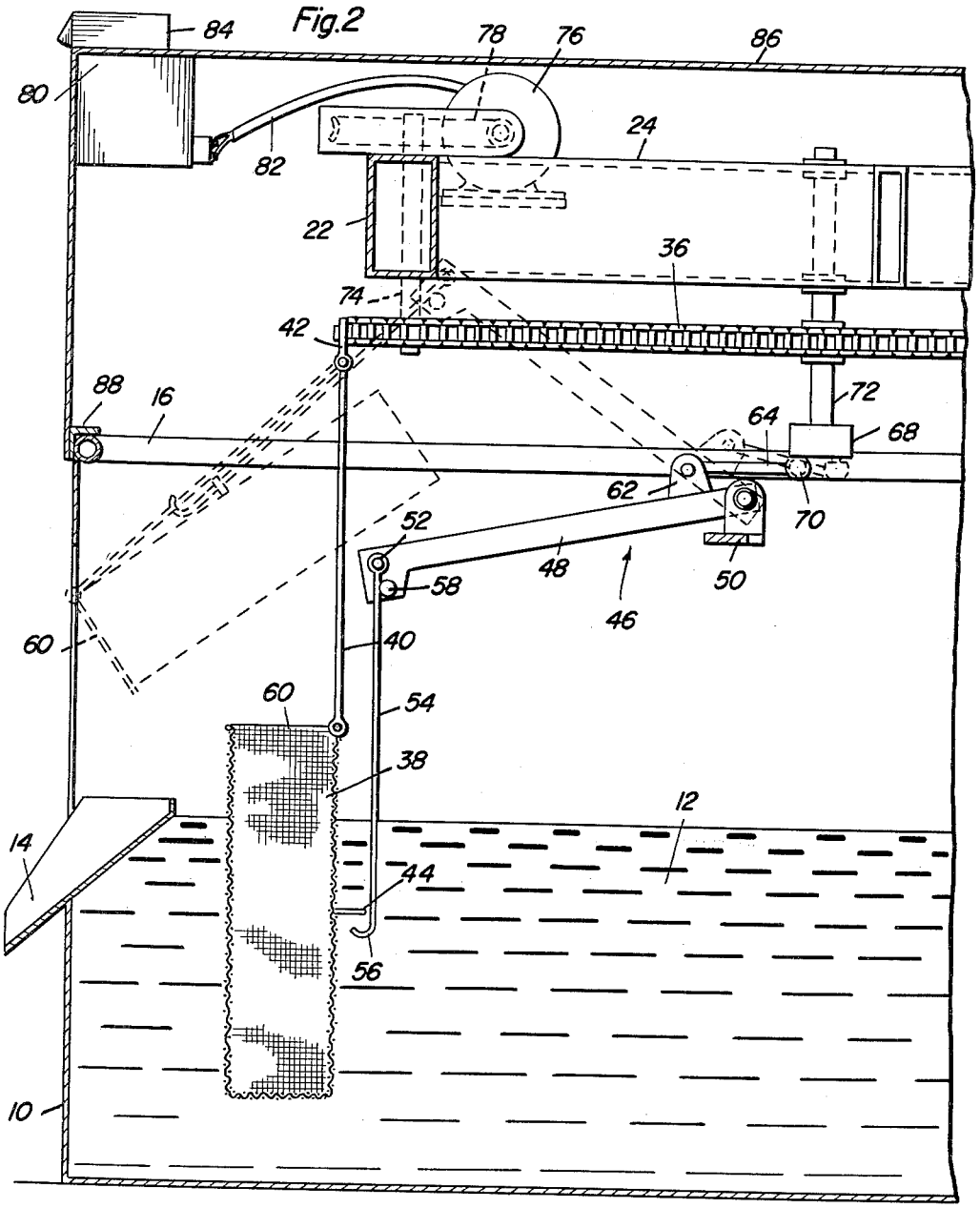

United States Patent Office 3,048,937
Patented Aug. 14, 1962

3,048,937
LIVE BAIT DISPENSER
Grant L. Hustad, P.O. Box 26, Glenwood, Minn.
Filed June 23, 1960, Ser. No. 38,167
10 Claims. (Cl. 43—55)

This invention relates to a dispensing or vending apparatus for merchandising live bait such as minnows or the like in a rapid and efficient manner.

It is therefore a primary object of this invention to provide a vending machine which is coin operated and effective in a novel and improved manner to more completely and positively dispense therefrom a selected quantity of live bait which is maintained in healthy condition in the machine.

The vending machine made in accordance with this invention includes a water tank within which the water is circulated through an inlet and outlet so as to maintain it fresh and otherwise condition the water so as to sustain life of the live bait disposed within the water. A conveying mechanism is mounted in horizontal position above the water level within the water tank from which conveying mechanism a plurality of wire mesh baskets are suspended and movable by means of the conveying mechanism. The wire mesh baskets contain the selected quantities of live bait and permit the passage of water therethrough since they are suspended within the water so that the live bait within the baskets may be maintained in healthy condition until the time that the baskets are relieved of their contents into a delivery chute disposed at one end of the water tank. A dumping mechanism is therefore provided adjacent said one end of the water tank which is effective on actuation thereof to engage a guide bar connected to each of the baskets. As a basket is conveyed by the conveying mechanism into proximity with the delivery chute, it will be engaged by the dumping mechanism and upon operation thereof the basket will be raised and pivotally displaced relative to its suspension connection to the conveying mechanism and also cause displacement of the suspension connection so as to empty the contents of the basket out of the open top end thereof into the delivery chute with a more positive discharge action. The dumping mechanism subsequently is lowered to then release the basket which is then freely suspended from the conveying mechanism and carried back toward the opposite end of the water tank so that it may be charged with a predetermined quantity of live bait. The dumping mechanism is accordingly driven and actuated in timed relation to the conveying mechanism and hence is drivingly connected thereto for said purpose. An electric motor is provided for operating the conveying mechanism which mechanism may be in the form of an endless sprocket chain, said electric motor being energized to rotate a predetermined number of revolutions to move the chain a certain amount and in addition to effect dumping of a single bait containing basket at a time, by means of a coin operated switch control mechanism.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a sectional view taken through a plane indicated by section line 2—2 in FIGURE 1.

Figure 1:
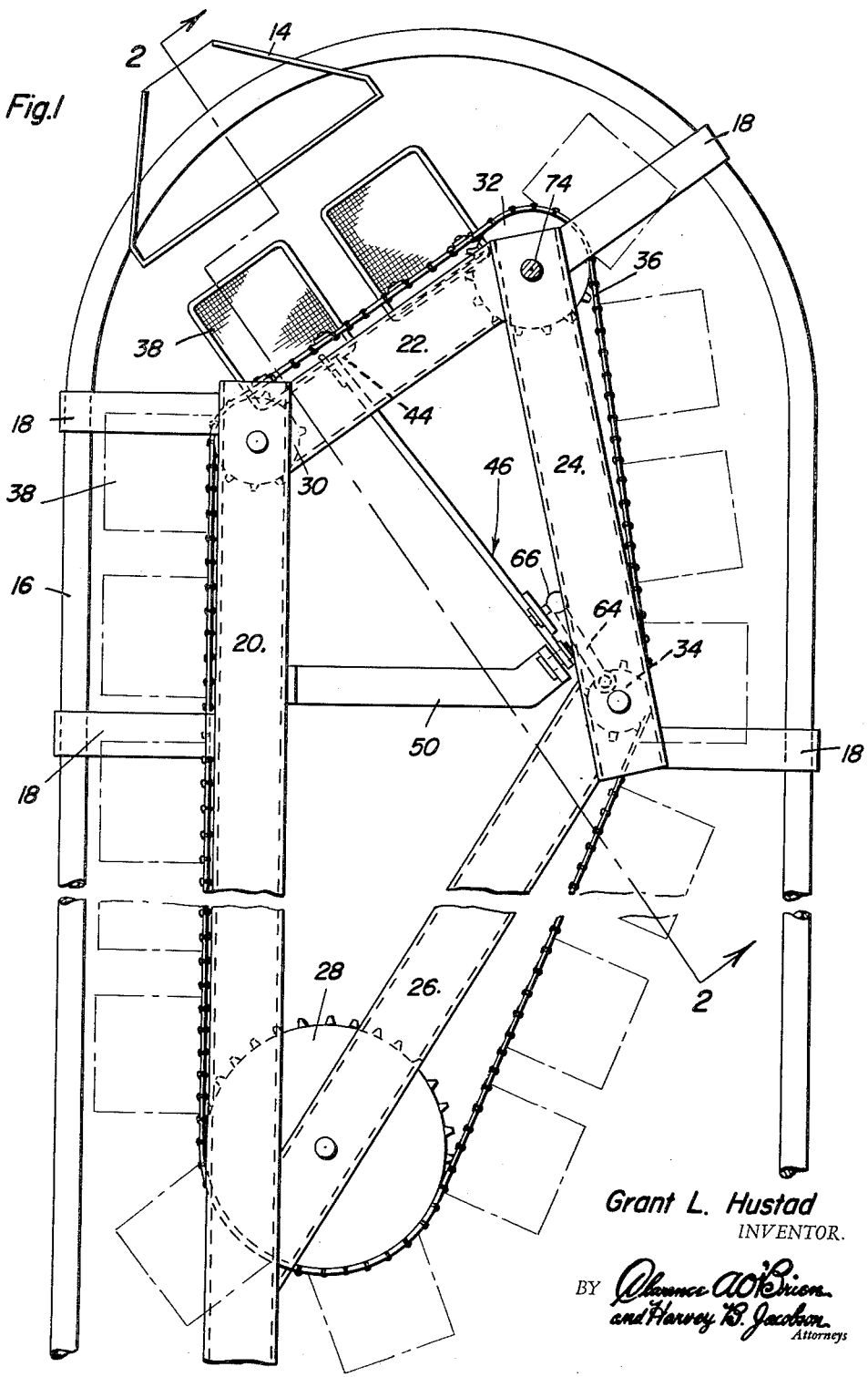
FIGURE 1 is a partial top plan view of the live bait vending apparatus.

Referring to the drawing in detail, the dispensing apparatus comprises a water tank 10 as seen in FIGURE 2 containing a quantity of water 12 which is circulated and maintained in fresh condition in a manner well known in the art. The water tank may be of considerable length so as to contain a large quantity of live bait.

Disposed at one end of the water tank is a delivery chute 14 into which the live bait is deposited. The upper end of the delivery chute is disposed above the level of the water 12 as seen in FIGURE 2. Accordingly, a collecting receptacle is disposed beneath the lower end of the delivery chute 14 for receiving the dispensed live bait therefrom.

Connected to the top of the water tank and disposed above the water level, is a tubular frame 16. The tubular frame has connected thereto a plurality of mounting brackets 18 which thereby mount on the frame 16 a plurality of interconnected tubular frame members 20, 22, 24 and 26 as more clearly seen in FIGURE 1. These tubular frame members constitute the supporting frame for a conveying mechanism. The conveying mechanism comprises a sprocket wheel 28 rotatably mounted within the frame member 26, a sprocket wheel 30 rotatably mounted within the frame member 20 adjacent to the delivery end of the water tank, a sprocket wheel 32 rotatably mounted within the frame member 24 also positioned adjacent to the delivery end of the water tank and a sprocket wheel 34 rotatably mounted at the other end of the frame member 24. An endless sprocket chain 36 is trained around the sprocket wheels 28, 30, 32 and 34. As will be seen in the drawing, a plurality of wire mesh baskets 38 are suspended from the sprocket chain 36 in spaced relation from each other by means of connecting links 40 which are pivotally connected to upper edge portions of the baskets 38 and pivotally connected to the chain 36 by means of pivot connections 42. The baskets are of open wire mesh construction so that the water 12 through which it passes may freely pass therethrough so as to maintain the live bait contained within the baskets 38 in healthy condition. It will also be observed that a guide bar 44 is attached to the rear side of each basket 38 for purposes as will hereafter be explained.

It will be observed that the baskets 38 are moved by means of the sprocket chain 36 toward the delivery end of the water tank and that when the basket travels between the sprocket wheels 30 and 32 they are moved parallel to the inlet end of the delivery chute 14. Accordingly, the dumping mechanism generally indicated by reference numeral 46 is provided for engagement with the baskets 38 as they move from sprocket wheel 30 toward sprocket wheel 32. The dumping mechanism comprises a lever member 48 which is pivotally mounted on a mounting bracket member 50 which is secured to the conveyor frame member 20 as seen in FIGURE 1. As seen in FIGURE 2, the lever member 48 has pivotally connected to its outer end by means of pivot pin 52 a hook member 54, the lower end of which is disposed within the water 12 and has an engaging portion 56. The hook member 54 is disposed within the water as illustrated in FIGURE 2 when the lever member is in its lower position as illustrated by solid line in FIGURE 2. When the lever member 48 is raised to an upper position as shown by dotted line in FIGURE 2, the hook member 54 is limited in its movement relative to the lever member 48 by means of stop pin 58 and will engage the guide bar 44 by means of its hook engaging portion 56 to raise the basket 38 and cause it to pivot about the lower pivot end of suspending link 40. As the lever member 48 is raised the guide bar 44 will rotate relative to the engaging portion 56 and slide relative to the hook member 54 as the connecting link member 40 also pivots relative to the chain pivot member 42 toward the delivery chute 14 as shown by dotted line in FIGURE 2 in order to accommodate movement of the lever member 48 and to more forcibly discharge the contents of the baskets 38. The basket 38 is therefore so displaced relative to the sprocket chain suspension and the delivery chute so that the open end top 60 is finally disposed beneath the closed bottom end of the basket and above the delivery chute 14 as shown by dotted line in FIGURE 2 so that the contents of the basket will be deposited and impelled into the delivery chute. When the lever member 48 is again lowered to its illustrated position in FIGURE 2, the basket will be returned to its original position, this occurring when the basket has traversed the distance between sprocket wheels 30 and 32 and approaches sprocket wheel 32 by means of the moving chain 36. It will be observed that the engaging hook 56 which is stationary in a horizontal plane will slide relative to the bar 44 from one end thereof to the other as the basket 38 is moved toward the sprocket wheel 32.

It will therefore be appreciated that the operation of the dumping mechanism 46 must be related to the movement of the sprocket chain 36. Accordingly, the lever member 48 of the dumping mechanism is operated by being drivingly connected to the moving sprocket chain 36 in timed relation thereto. The lever member 48 therefore is pivotally connected by means of pivot bracket 62 to a pitman member 64 through a universal joint 66. The pitman member 64 is pivotally connected to a crank disk 68 by means of a second universal joint 70. The crank member 68 is in turn connected to a drive shaft 72 which is connected to the sprocket wheel 34 engaged with the sprocket chain 36. The shaft 72 is rotatably mounted within the frame member 24 as will be apparent in FIGURE 2. As a result thereof, the dumping mechanism 46 operates in timed relation to the movement of the sprocket chain 36.

In order to impart movement to the sprocket chain 36, the sprocket wheel 32 is driven from an input shaft 74 which is geared to an electric motor 76 by means of a worm gearing 78 providing a high reduction so as to move the sprocket chain 36 slowly to properly operate the dispensing machine.

A coin operated mechanism 80 which may be of any suitable type known to those skilled in the art is provided for controlling the operation of motor 76 and is electrically connected thereto by means of electrical connection 82 as seen in FIGURE 2. A coin box 84 is provided into which the coins are inserted for initiating operation of the control mechanism 80. Accordingly, the motor 76 is rotated a predetermined number of revolutions so as to move a basket 38 across the inlet of the delivery chute 14 between the sprocket wheels 30 and 32 and at the same time cause the dumping mechanism 46 to raise and empty the contents of the basket 38 and subsequently release the basket 38 as it approaches the sprocket wheel 32. The motor then stops so that a single dumping of live bait occurs at one time.

It will be observed in FIGURE 2, that the motor 76 may be attached or mounted on the frame member 24 while the control mechanism 80 and coin box 84 are mounted on a cover member 86 which rests on the tubular frame 16 by means of angle member 88 attached to the bottom portion of the cover member 86.

From the foregoing description, operation and use of the vending machine will be apparent.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A live bait dispensing apparatus comprising, circulating water tank means, conveying means mounted above said tank means, a plurality of basket means containing live bait, suspension means operatively connected to said basket means at an upper open end thereof and pivotally connected to said conveying means for displaceable suspension of the basket means within said water tank means below water level thereof for passage of water through the basket means, delivery means connected to said tank means at one end thereof and disposed above the water level, dumping means mounted on said tank means and operatively connected to said conveying means for operation in timed relation thereto to engage each basket means as it is moved into proximity with said delivery means for constrained displacement of the basket means relative to said conveying means and delivery means so as to dump and impel its contents into the delivery means.

2. The apparatus as defined in claim 1, wherein said dumping means comprises a lever means pivotally mounted on said tank means above the basket means, suspended hook means pivotally connected to one end of said lever means and having an engaging portion at a lower end thereof which is engageable with guide bar means attached to each basket means, and linkage means drivingly connecting said lever means to said conveying means for raising said lever means and hook means for dumping of a basket means.

3. The apparatus as defined in claim 2, wherein said basket means are made of wire mesh and said conveying means includes an endless sprocket chain.

4. The apparatus as defined in claim 3, including motor means engageable with said sprocket chain for driving thereof and a sprocket wheel means driven by said chain which is connected to said linkage means.

5. The apparatus as defined in claim 4, including coin operated motor control means mounted above said tank means and operatively connected to said motor means to energize and rotate said motor means a predetermined number of revolutions to effect dumping of one basket means at a time.

6. The apparatus as defined in claim 1, including coin operated power means drivingly connected to said conveying means and operative to effect dumping of one basket means at a time.

7. In a live bait dispensing apparatus, conveyor means, basket means having an open upper end, pivotally displaceable suspension means suspending said basket means from the conveyor means for movement past a dispensing station and displacement with respect to direction of movement, and dumping means operatively connected to the conveyor means and engageable with the basket means to pivotally invert the basket means rearwardly relative to the suspension means and displace the suspension means forwardly toward the dispensing station to completely discharge a load of bait contained within the basket means.

8. The combination of claim 7, wherein said dumping means includes lever means, hook means pivotally connected to the lever means, guide means mounted rearwardly of the basket means for engagement by the hook means to pivotally displace the basket means in response to initial pivotal movement of the lever means and in response to subsequent pivotal movement cause slidable movement of the basket means relative to the hook means to pivotally displace the suspension means forwardly toward the dispensing station.

9. The combination of claim 7, wherein said suspension means comprises a plurality of suspension links pivotally connected to said conveyor means in spaced relation to each other and pivotally connected to said basket means.

10. The combination of claim 1, wherein said suspension means comprises a plurality of suspension links pivotally connected to said conveying means in spaced relation to each other and pivotally connected to said basket means.

References Cited in the file of this patent
UNITED STATES PATENTS

| | | |
|---|---|---|
| 2,860,444 | McHugh | Nov. 18, 1958 |
| 2,908,105 | Rogers | Oct. 13, 1959 |